US009569271B2

(12) United States Patent
Farhan et al.

(10) Patent No.: US 9,569,271 B2
(45) Date of Patent: Feb. 14, 2017

(54) OPTIMIZATION OF PROPRIETARY WORKLOADS

(71) Applicant: Dell Products L.P., Round Rock, TX (US)

(72) Inventors: Munif M. Farhan, Round Rock, TX (US); Charles G. Morton, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 61 days.

(21) Appl. No.: 14/613,158

(22) Filed: Feb. 3, 2015

(65) Prior Publication Data

US 2016/0224377 A1 Aug. 4, 2016

(51) Int. Cl.
*G06F 9/46* (2006.01)
*G06F 9/50* (2006.01)

(52) U.S. Cl.
CPC .................... *G06F 9/505* (2013.01)

(58) Field of Classification Search
CPC ........................................................ G06F 9/505
USPC ............................................................. 718/104
See application file for complete search history.

(56) References Cited

U.S. PATENT DOCUMENTS

| | | | |
|---|---|---|---|
| 8,286,195 B2 | 10/2012 | Finger | |
| 8,689,227 B2 * | 4/2014 | Blanding | G06F 9/5061 718/104 |
| 2007/0168244 A1 | 7/2007 | Dan | |
| 2007/0198982 A1 | 8/2007 | Bolan | |
| 2007/0240161 A1 | 10/2007 | Prabhakar et al. | |
| 2008/0270523 A1 | 10/2008 | Parmar et al. | 709/203 |
| 2009/0100435 A1 * | 4/2009 | Papaefstathiou | G06F 9/5011 718/104 |
| 2011/0154353 A1 | 6/2011 | Theroux et al. | 718/104 |
| 2012/0192186 A1 | 7/2012 | Bornstein | |
| 2014/0108639 A1 | 4/2014 | Nelke et al. | 709/224 |
| 2015/0066470 A1 * | 3/2015 | Chopra | G06F 3/0605 703/20 |
| 2015/0169036 A1 * | 6/2015 | Sodhi | G06F 1/3243 713/320 |

OTHER PUBLICATIONS

International Search Report and Written Opinion, Application No. PCT/US2016/012329; 12 pages, Apr. 15, 2016.
U.S. Appl. No. 14/613,191, filed Feb. 3, 2015, entitled "Dynamically Controlled Workload Execution by an Application".

(Continued)

*Primary Examiner* — Wei Zhen
*Assistant Examiner* — Lanny Ung
(74) *Attorney, Agent, or Firm* — Baker Botts L.L.P.

(57) ABSTRACT

Methods and systems for optimization of proprietary workloads involve receiving workload simulation data indicative of a proprietary computing task using proprietary information. Workload attributes are generated based on the workload simulation data without using the proprietary information. The workload attributes are used to dynamically determine a workload policy for configuration of hardware resources at an information handling system executing the proprietary computing task. After dynamic configuration of the hardware resources according to the workload policy, the proprietary computing task is executed at the information handling system.

20 Claims, 9 Drawing Sheets

(56) References Cited

OTHER PUBLICATIONS

U.S. Appl. No. 14/613,137, filed Feb. 3, 2015, entitled "Dynamically Controlled Workload Execution".
U.S. Appl. No. 14/613,097, filed Feb. 3, 2015, entitled "Dynamically Controlled Distributed Workload Execution".
International Search Report and Written Opinion, Application No. PCT/US2016/012317; 13 pages, Mar. 23, 2016.

* cited by examiner

OPTIMIZATION OF PROPRIETARY WORKLOADS

TECHNICAL FIELD

This disclosure relates generally to information handling systems and more particularly to optimization of proprietary workloads.

BACKGROUND

As the value and use of information continues to increase, individuals and businesses seek additional ways to process and store information. One option available to users is information handling systems. An information handling system generally processes, compiles, stores, and communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As the performance capability of hardware used in information handling systems has increased, many software components and architectures may not effectively utilize the performance capability of available hardware.

SUMMARY

In one aspect, a disclosed method for optimization of proprietary workloads on information handling systems includes receiving, at a second information handling system, workload simulation data indicative of a proprietary computing task executable on a first information handling system. In the method, the workload simulation data may not include proprietary data used by the proprietary computing task. Based on the workload simulation data, the method may include determining workload attributes of the proprietary computing task, the workload attributes including dependency of the proprietary computing task on hardware resources included in the first information handling system. The method may include identifying the hardware resources present at the first information handling system. Based on the workload attributes determined and the hardware resources identified, the method may include determining, at the second information handling system, a workload policy for the proprietary computing task. In the method, the workload policy may specify the hardware resources used to execute the computing task at the first information handling system. The method may also include sending the workload policy to the first information handling system. In the method, the workload policy may be usable by the first information handling system to execute the proprietary computing task using the proprietary information.

In another aspect, at least one disclosed non-transitory computer readable medium, includes computer readable instructions for optimization of proprietary workloads, the instructions executable by a processor.

In yet another aspect, an information handling system is disclosed for optimization of proprietary workloads.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Figure 1:
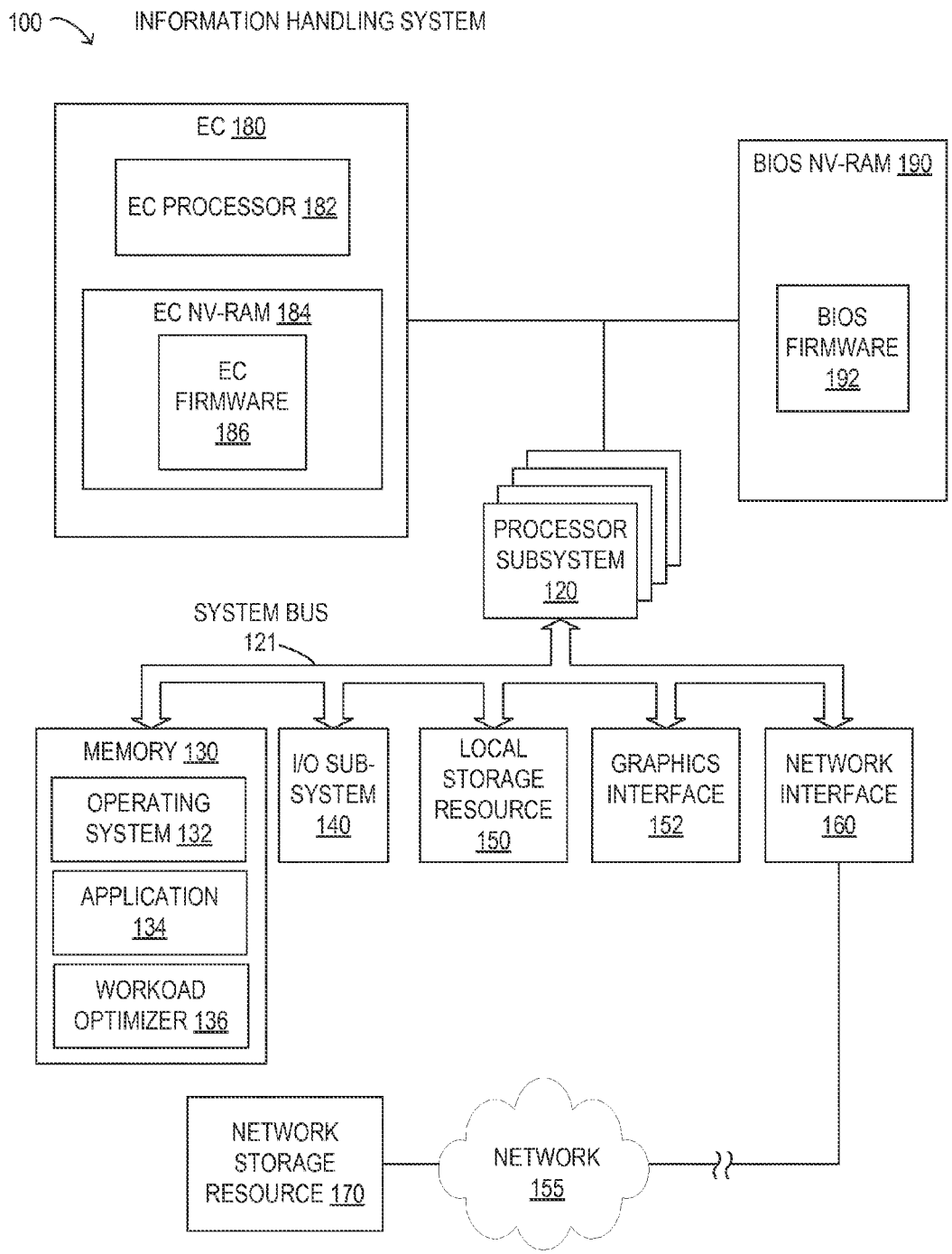
FIG. 1 illustrates a block diagram of selected elements of an embodiment of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, as an example (not shown in the drawings), device "12-1" refers to an instance of a device class, which may be referred to collectively as devices "12" and any one of which may be referred to generically as a device "12". In the figures and the description, like numerals are intended to represent like elements.

For the purposes of this disclosure, an information handling system may include an hardware resource or aggregate of hardware resources operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Additionally, the information handling system may include firmware for controlling or communicating with, for example, hard drives, network circuitry, memory devices, I/O devices, and other peripheral devices. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

As will be described in further detail, the inventors of the present disclosure have discovered methods and systems for context and optimization. The methods and systems aggregate and derive context information of coupled information handling systems in order to optimize resources across the various information handling systems.

Particular embodiments are best understood by reference to FIGS. 1-8 wherein like numbers are used to indicate like and corresponding parts.

FIG. 1 illustrates a block diagram depicting selected elements of an embodiment of information handling system 100, in accordance with embodiments of the present disclosure. In particular embodiments, one or more information handling systems 100 perform one or more steps of one or more methods described or illustrated herein. In particular embodiments, one or more information handling systems 100 provide the functionality described or illustrated herein. In particular embodiments, software running on one or more information handling systems 100 performs one or more steps of one or more methods described or illustrated herein or provides functionality described or illustrated herein. Particular embodiments include one or more portions of one or more information handling systems 100. Herein, reference to an information handling system may encompass a computing device, and vice versa, where appropriate. Moreover, reference to an information handling system may encompass one or more information handling systems, where appropriate. Also shown with information handling system 100 is network 155, which is external or remote to information handling system 100.

As shown in FIG. 1, components of information handling system 100 include, but are not limited to, processor subsystem 120, which may comprise one or more processors, and system bus 121 that communicatively couples various system components to processor subsystem 120 including, for example, memory 130, I/O subsystem 140, local storage resource 150, graphics interface 152, and network interface 160. In certain embodiments, graphics interface 152 may include a graphics processor. System bus 121 represents a variety of suitable types of bus structures, e.g., a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, Peripheral Component Interconnect (PCI) bus, PCI-Express bus, HyperTransport (HT) bus, and Video Electronics Standards Association (VESA) local bus.

In FIG. 1, network interface 160 is a suitable system, apparatus, or device operable to serve as an interface between information handling system 100 and a network 155. Network interface 160 may enable information handling system 100 to communicate over network 155 using a suitable transmission protocol or standard, including, but not limited to, transmission protocols and standards enumerated below with respect to the discussion of network 155. In some embodiments, network interface 160 may be communicatively coupled via network 155 to other information handling systems. Network 155 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and messages (generally referred to as data). Network 155 may transmit data using a desired storage or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), or any combination thereof. Network 155 and its various components may be implemented using hardware, software, or any combination thereof. In certain embodiments, information handling system 100 and network 155 may be included in a rack domain.

As depicted in FIG. 1, processor subsystem 120 is a system, device, or apparatus operable to interpret or execute program instructions and to process data. Processor subsystem 120 may include a microprocessor, microcontroller, digital signal processor (DSP), application specific integrated circuit (ASIC), or another digital or analog circuitry to interpret or execute program instructions and to process data. In some embodiments, processor subsystem 120 may interpret or execute program instructions and process data stored in memory 130. In the same or alternative embodiments, processor subsystem 120 may interpret or execute program instructions and process data stored remotely, such as in network storage resource 170.

Also in FIG. 1, memory 130 comprises a system, device, or apparatus operable to retain and retrieve program instructions or data for a period of time, such as computer-readable media. As shown in the example embodiment of FIG. 1, memory 130 stores operating system 132 and application 134. Operating system 132 may represent instructions executable by processor subsystem 120 to operate information handling system 100 after booting. It is noted that in different embodiments, operating system 132 may be stored at network storage resource 170 coupled to network 155 and may be accessed by processor subsystem 120 via network interface 160. Application 134 may represent instructions executable by processor subsystem 120 for implementing generic application functionality, which may include a user interface and access to computing resources, such as local storage resource 150, for example. Memory 130 may comprise random access memory (RAM), electrically erasable programmable read-only memory (EEPROM), a PCMCIA card, solid-state memory, magnetic storage, opto-magnetic storage, and a suitable selection (such as an array) of volatile or non-volatile memory. Non-volatile memory includes memory that retains data after power is removed.

Local storage resource 150 may comprise computer-readable media, such as a hard disk drive, a floppy disk drive, CD-ROM, or another type of rotating storage media, solid-state memory, EEPROM, or another type of solid state storage media. Local storage resource 150 may be generally operable to store instructions and data. For example, local storage resource 150 may store executable code in the form of program files that may be loaded into memory 130 for execution.

In information handling system 100, I/O subsystem 140 comprises a system, device, or apparatus generally operable to receive and transmit data with respect to information handling system 100. I/O subsystem 140 may include, for example, a variety of communication interfaces, graphics interfaces, video interfaces, user input interfaces, and peripheral interfaces. In certain embodiments, I/O subsystem 140 may comprise a touch panel or a display adapter. The touch panel (not shown) may include circuitry for enabling touch functionality in conjunction with a display (not shown) that is driven by display adapter (not shown).

Also shown in FIG. 1 is embedded controller (EC) 180, which may include EC processor 182 as a second processor included with information handling system 100 for certain management tasks. EC processor 182 may have access to EC non-volatile random access memory (NV-RAM), which may store EC firmware 186, representing instructions executable by EC processor 182. Also shown is BIOS firmware 192, stored in BIOS NV-RAM 190, often simply or collectively referred to as the 'BIOS'. BIOS firmware 192 may represent pre-boot instructions executable by processor subsystem 120, for example, for preparing information handling system 100 to boot by activating various hardware components in preparation of launching operating system 132 for execution. In some embodiments, BIOS firmware 192 may be executable by EC processor 182.

In operation, operating system 132 or application 134 may be configured to execute on information handling system 100. Because operating system 132 or application 134 may not be optimized for a hardware configuration of information handling system 100, workload optimizer 136 may perform certain dynamic optimizations of the hardware configuration, as described in further detail herein. Workload optimizer 136 may implement various dynamic optimizations using any one or more of operating system 132, EC firmware 186, EC processor 192, BIOS firmware 192, I/O subsystem 140, local storage resource 150, graphics interface 152, and network interface 160, among others resources or hardware resources associated with information handling system 100.

Figure 2:
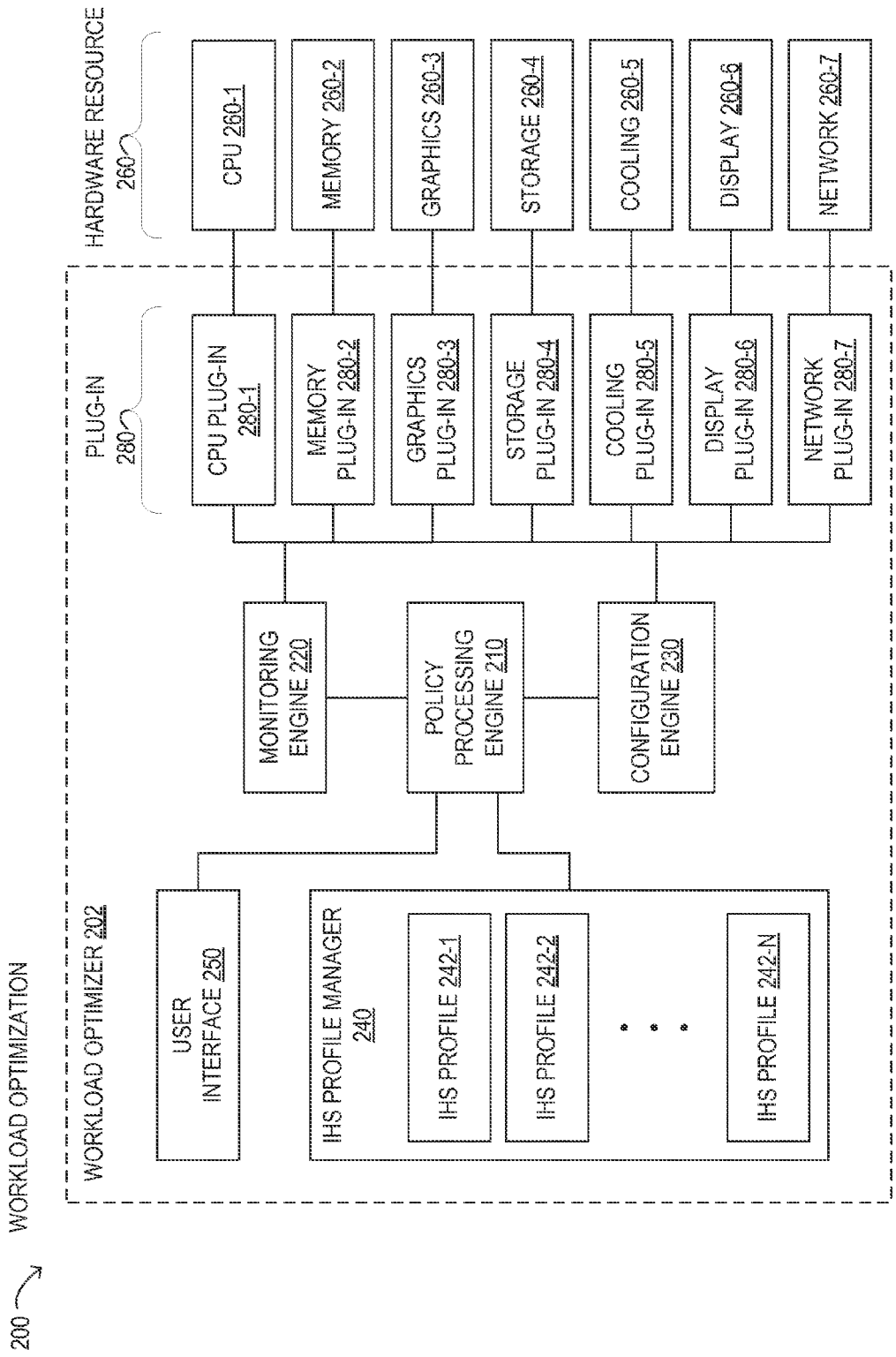
FIG. 2 is a block diagram of selected elements of an embodiment of a workload optimization.

FIG. 2 illustrates a block diagram of an embodiment of a workload optimization 200, in accordance with some embodiments of the present disclosure. As shown, workload optimization 200 represents an architecture for workload optimization at an information handling system, including any embodiments of the information handling system 100 discussed in FIG. 1. Workload optimization 200 may include any suitable combination or number of elements or modules to perform the functionality described herein. As shown in FIG. 2, workload optimization 200 includes workload optimizer 202 and hardware resources 260. Workload optimizer 202 may represent an embodiment of workload optimizer 136 shown in FIG. 1. As shown, workload optimizer 202 includes a policy processing engine 210, monitoring engine 220, configuration engine 230, IHS profile manager 240, a user interface 250, and plug-ins 280. Workload optimizer 202 may monitor and configure hardware resources on an information handling system, such as information handling system 100. Hardware resources 260 represent certain hardware elements or components, including components described with respect to information handling system 100 in FIG. 1.

In workload optimization 200, workload optimizer 202 includes policy processing engine 210. Policy processing engine 210 may be implemented in any suitable manner. For example, policy processing engine 210 may be implemented by code, instructions, libraries, shared libraries, software-as-a-service, functions, applications, scripts, or executables. Although illustrated as a single element in FIG. 2, policy processing engine 210 may be implemented through a combination of elements. In some embodiments, policy processing engine 210 may be configured to optimize workloads executing on one or more information handling systems.

In some embodiments, policy processing engine 210 may be used to optimize a workload that is executed at an information handling system by configuring hardware resources 260 to operate in a manner that is specifically matched to attributes of the workload. User interface 250 represents a user interface that a user may operate to use policy processing engine 210, for example, to specify the workload or to select a profile used to implement a particular workload policy.

Policy processing engine 210 may analyze and act in accordance with one or more IHS profiles 242 maintained and managed by IHS profile manager 240. In certain embodiments, IHS profiles 242 may be selected, created, modified, and removed from IHS profile manager 240 by the manufacturer of the information handling system or hardware resource 260. For example, the manufacturer of a computer system may provide IHS profile 242 for conserving power consumption. In particular embodiments, IHS profile 242 may be selected, created, modified, and removed from IHS profile manager 240 by policy processing engine 210. For example, policy processing engine 210 may select IHS profile 242 for conserving power upon detecting that a computer system has been unplugged from a power source. In some embodiments, IHS profile manager 240 may be an application configured to manage profiles 242 and communicate profile information to policy processing engine 210.

As shown, IHS profile manager 240 may include IHS profiles 242-1, 242-2, and so on, up to 242-N representing N number of profiles where N is any desired number. The IHS profiles 242 may be received by policy processing engine 210 and used to implement a particular workload policy. IHS profiles 242 may accordingly include policy information, such as execution scenarios with particular configurations (or settings) of hardware components, as represented by hardware resources 260. IHS profiles 242 may be specific to a user, a type of usage of the information handling system, a particular information handling system, or an application executing on the information handling system, among other examples. IHS profile manager 240 may be enabled to store, retrieve, create, delete, add, and modify IHS profiles 242 on a local or a remote storage, for example, in response to user input received via user interface 250. In certain embodiments, IHS profile manager 240 operates in a distributed manner across a network, for example, in conjunction with distributed profile manager 340 described below with respect to FIG. 3.

Policy processing engine 210 may monitor various hardware resources 260 of the information handling system. For example, policy processing engine 210 may be communicatively coupled to monitoring engine 220, thereby receiving monitored information on one or more hardware resources 260 via a respective plug-in 280. Monitoring engine 220 may be implemented in any suitable manner, such as by code, instructions, libraries, shared libraries, software-as-a-service, functions, applications, scripts, or executables. Although illustrated as a single element, monitoring engine 220 may be implemented through a combination of elements. In some embodiments, monitoring engine 220 may be configured to monitor hardware resources of more than one physical information handling system.

Policy processing engine 210 may actively configure (or change settings for) various hardware resources 260 of the information handling system. For example, policy processing engine 210 may be communicatively coupled to configuration engine 230, to configure hardware resources 260 according to a workload policy via a respective plug-in 280. Configuration of hardware resources 260 may be implemented in various ways by plug-in 280. For example, plug-in 280 may directly access BIOS NV RAM 190 to change a setting used by BIOS firmware 192. Plug-in 280 may access or communicate with EC 180 to change a hardware setting. Plug-in 280 may further access, or may include, hardware drivers, such as operating system drivers for individual ones of hardware resources 260. Configuration engine 230 may be implemented in any suitable manner. For example, configuration engine 230 may be implemented by code, instructions, libraries, shared libraries, software-as-a-service, functions, applications, scripts, or executables. Although illustrated as a single element, configuration engine 230 may be implemented through a combination of elements. In some embodiments, configuration engine 230 may configure hardware resources at more than one information handling system.

Plug-in 280 may represent modular code that is installed in workload optimizer 202 for accessing particular hardware resources 260. Accordingly, each plug-in 280 may be specific to a particular hardware resource 260 as well as being specific to workload optimizer 202. Each one of plug-in 280 may include monitoring and configuration functionality that may be implemented separately or may be combined. In other words, plug-in 280 may enable independent operation of monitoring engine 220 and configuration engine 230. As hardware resources 260 are added, removed, updated, replaced, etc., a corresponding plug-in 280 may be added, removed, updated, replaced, etc. As shown, CPU plug-in 280-1 may provide monitoring and configuration support for CPU 260-1, which may represent a processor or a processor subsystem; memory plug-in 280-2 may provide monitoring and configuration support for memory 260-2, which may represent a main memory accessible to CPU 260-1; graphics plug-in 280-3 may provide monitoring and configuration support for graphics 260-3, which may represent a graphics interface or a graphics processing unit; storage plug-in 280-4 may provide monitoring and configuration support for storage 260-4, which may represent a local or a remote storage resource; cooling plug-in 280-5 may provide monitoring and configuration support for cooling 260-5, which may represent a thermal control system; display plug-in 280-6 may provide monitoring and configuration support for display 260-6, which may represent one or more display devices, for example, coupled to graphics 260-3; and network plug-in 280-7 may provide monitoring and configuration support for network 260-7, which may represent any one or more network interfaces. It is noted that plug-ins 280 and hardware resources 260 described are exemplary and may include other elements in various embodiments.

In operation, policy processing engine 210 may receive a workload request, such as from a user via user interface 250. The workload request may specify a computing task, such as a computing task executed by application 134. In some embodiments, the workload request may be for a distributed computing task from a different information handling system seeking to execute certain portions of the distributed computing task using policy processing engine 210, among other distributed resources. The workload request may include an indication of a particular one of IHS profile 242. Alternatively, policy processing engine 210 may select one of IHS profile 242 based on other information, such as the user (or user account) or application 134 in various embodiments. In certain embodiments, application 134 itself may include functionality for generating a workload request or executing computing tasks using policy processing engine 210. In some embodiments, at least certain portions of workload optimizer 202 are included in application 134.

Based on the workload request, policy processing engine 210 may determine workload attributes of the computing task. The workload attributes may include dependencies of the computing task on hardware resources 260. For example, when the computing task includes multithreading, activation of multiple cores within a CPU, when available, may be desirable. Alternatively, when the computing task executes within a single thread, the computing task may execute most efficiently when sent to a single core within a CPU, which may be desirable. Accordingly, the workload attributes may specify any one or more of a degree of multithreading, a thread priority, and an instruction set architecture. The workload attributes may specify any one or more of a desired processor frequency, processor cache capacity, processor cache architecture, processor cache throughput, memory capacity, memory bus speed, memory throughput, and usage of a non-uniform memory architecture, for example. The workload attributes may specify a desired degree of background execution or a tolerable network latency, for example. The workload attributes may further specify any one or more of a desired storage capacity, a minimum storage available, a storage data throughput, and a storage latency. The workload attributes may also specify any one or more of a degree of acceleration by a graphics processing unit, a vertical synchronization setting, a degree of digital signal processing, a degree of integer processing, a degree of background execution, and an operating system, among other desired attributes for the workload.

Then, policy processing engine 210 may identify specific ones of hardware resources 260 present at the information handling system, for example, via monitoring engine 220. In addition, policy processing engine 210 may monitor an operational state of at least some of hardware resources 260 in order to determine which configuration changes are indicated by the workload attributes, or which configuration settings are already commensurate with the workload attributes. Hardware resources 260 may any one of a variety of resources, including resources depicted in FIG. 2. Specifically, hardware resources 260 may include aspects such as a number of processor cores available, a degree of exclusive access to processor cores available, a degree of processor multithreading available, a degree of background execution available, a degree of user mode execution available, a processor frequency, a processor architecture, a processor cache architecture, a processor power state, a processor cache capacity available, a processor power consumption available, and an instruction set architecture available. Other hardware resources 260 may include aspects such as a graphics processing unit available, a memory capacity available, a memory throughput available, a degree of non-uniform memory access available, a storage capacity available, a storage throughput available, and a storage latency available. Still other hardware resources 260 may include aspects selected from a network capacity available, a network throughput available, a network latency available, a system reboot feature, and a system power down feature. Other aspects related to hardware resources 260 are also contemplated.

Next, based on the workload attributes and hardware resources 260, policy processing engine 210 may determine a workload policy for the computing task. The workload policy may be based on one of IHS profile 242, as noted above. The workload policy may specify hardware resources 260 used to execute the computing task, such as by specifying specific settings for aspects of identified hardware resources 260. After determining the workload policy, policy processing engine 210 may implement the workload policy, for example, using configuration engine 230 to access plug-in 280, as noted above. Implementing the workload policy may involve various operations in different embodiments, such as reconfiguring internal or external hardware components. In some embodiments, the information handling system may be rebooted or restarted to implement a certain workload policy before the computing task is executed. When the workload policy is implemented, the computing task may be executed by the information handling system. It is noted that executing the computing task may involve long term operations, such as for a duration that a particular application is used by the user.

In another aspect, workload optimization 200 may be useable to optimize workloads that are proprietary, such as workloads that use proprietary data. For example, a manufacturer may use an application to model a new product that is proprietary, including computer-aided design that is integrated into the manufacturing process. The manufacturer may seek to optimize the workload associated with the new product using the application, which may include computer intensive operations, such as rendering in 3 dimensions. The manufacturer may install certain portions of workload optimizer 202, such as monitoring engine 220, which may monitor hardware resources 260 during execution of the proprietary workload. Monitoring engine 220 may generate workload simulation data as a result of monitoring the proprietary workload. However, monitoring engine 220 may generate the workload simulation data in a manner that does not include proprietary data, even though the workload simulation data reflects the same workload attributes and a computational complexity commensurate with the proprietary workload.

Then, the workload simulation data may be used at another information handling system by another instance of workload optimization 200. For example, the manufacturer in the example above may safely send the workload simulation data to a provider of the information handling system. Then, workload attributes may be determined based on the workload simulation data. For example, when the proprietary workload includes rendering of large complex systems, such as an airplane or a ship, the workload simulation data may specify graphical attributes commensurate with the proprietary data, such as a corresponding number of polygons, a corresponding type of polygons, corresponding texture data, animation data, and a corresponding number of parts or elements, among other examples. The workload attributes so determined may be characteristic of the proprietary workload. Accordingly, the workload attributes may include (or specify) dependency of a proprietary computing task on hardware resources. Then, the hardware resources may be identified and a workload policy may be determined. Also, based on the workload simulation data, a simulated computing task having the same workload attributes as the proprietary computing task. The simulated computing task may be used to model the proprietary computing task without relying on the proprietary information. The workload policy may then be implemented at an information handling system of the provider and the simulated computing task may be executed at the second information handling system when the workload policy is implemented. In this manner, the workload policy may be evaluated and tested using the simulated computing task, and modified or optimized to produce a desired computing efficiency or performance.

The workload policy determined in this manner without the proprietary data may be sent back to the manufacturer for executing the proprietary workload. The workload policy may be then used by workload optimization 200 to improve execution, such as performance, latency, or speed of the proprietary workload, while using the proprietary information.

In a further aspect, at least certain portions of workload optimizer 202 may be integrated into application 134. For example, certain functionality of workload optimizer 202 may be provided as a software development kit (SDK) to providers of application 134, who may integrate the functionality into a version of application 134. In this manner, at least certain portions of user interface 250, IHS profile manager 240, policy processing engine 210, monitoring engine 220, configuration engine 230, and plug-ins 260 may be integrated within application 134, as described herein.

Figure 3:
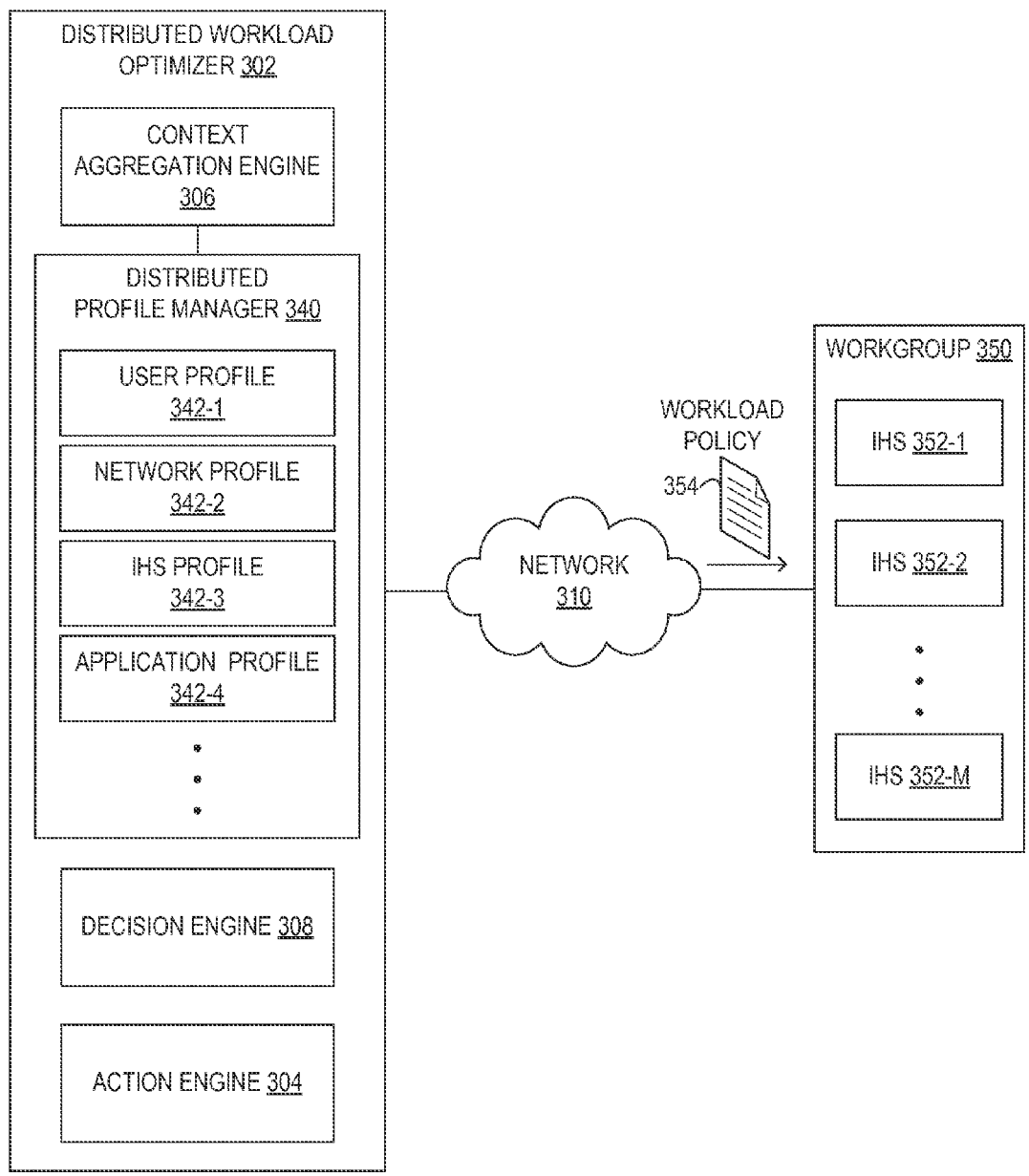
FIG. 3 is a block diagram of selected elements of an embodiment of a distributed workload optimization.

FIG. 3 is a block diagram of selected elements of an embodiment of a distributed workload optimization 300. Distributed workload optimization 300 may represent an architecture for optimizing execution of distributed computing workloads. In one embodiment, distributed workload optimization 300 may be use to distribute and optimize a workload among multiple information handling systems 352 in a networked environment. As shown, distributed workload optimization 300 includes one or more information handling systems 352 in a workgroup 350, network 310, and distributed workload optimizer 302. As shown, distributed workload optimizer 302 includes a context aggregation engine 306, a decision engine 308, an action engine 304, and distributed profile manager 340. In some embodiments, some or all of the elements of distributed workload optimization 300 may be communicatively coupled via a network 310. Information handling systems 352 may represent embodiments of information handling system 100 described with respect to FIGS. 1 and 2. Accordingly, it may be assumed that at least some of information handling systems 352 execute workload optimizer 202 in FIG. 2.

In distributed workload optimization 300, workgroup 350 is shown as a logical network including a plurality of information handling systems (IHS) 352. As shown, workgroup 350 may include information handling systems 352-1, 352-2, and so on, up to 352-M representing M number of information handling systems where M is any desired number. Although workgroup 350 is shown as a single instance for descriptive clarity, it will be understood that distributed workload optimization 300 is operable with different numbers of workgroups 350, including larger numbers of workgroups 350 and information handling systems 352. In certain embodiments, workgroup 350 may represent a network domain or an organizational entity, such as a location of an office or a department within an organization. Accordingly, workgroup 350 may represent a business entity or sub-entity having a physical infrastructure that includes information handling systems 352.

In distributed workload optimizer 302, context aggregation engine 306 may aggregate context information for optimizing execution of distributed workloads. Context aggregation engine 306 may derive different kinds of context information for distributed workload optimization. Context aggregation engine 306 may aggregate context information from various sources, including from distributed profile manager 340 and information handling systems 352. Context aggregation engine 306 may aggregate context information on information handling system 352 that is received from workload optimizer 202, for example, from IHS profile manager 240 or collected by monitoring engine 220. Context information may include location, capacity, temperature, version, status, and utilization of hardware resources, among other information. In some embodiments, context aggregation engine 306 may aggregate and store context information related to information handling system 352 into IHS profile 342-3. Context aggregation engine 306 may derive complex IHS context information. For example, context aggregation engine 306 may process system files, communications, and maintenance request records to derive security, usage, or reliability context for information handling system 352. As an example and not by way of limitation, an outdated operating system may indicate security or reliability concerns for a particular information handling system 352. In some embodiments, context aggregation engine 306 may update information handling system profile 342-3 with derived complex IHS context information. Context aggregation engine 306 may derive complex context information from data stored across various information handling systems 352. Specifically, context aggregation engine 306 may process files, databases, locations, or any other relevant data to derive complex context information. Context aggregation engine 306 may derive complex context information from changes to distributed workload optimization 300, such as based on the addition or the removal of information handling systems 302 from workgroup 350, in one example. Context aggregation engine 306 may also derive complex content information from profiles 342 or other data previously aggregated or stored by context aggregation engine 306. In some embodiments, context aggregation engine 306 may derive complex context information from predefined data associations, such as associations between calendar entries and user location. For example, context aggregation engine 306 may parse machine-readable extensible markup language, comma-separate values, database entries, etc., to discern the relationship or determine associations between certain pieces of context information. In certain embodiments, context aggregation engine 306 may use artificial intelligence algorithms to generate associations between otherwise disjointed data.

Context aggregation engine 306 may also aggregate context information from other sources via network 310, such as network topology, network device status, network utilization, or maintenance information related to network 310, among other examples. In certain embodiments, context aggregation engine 306 may aggregate and store information related to network 310 into network profile 342-2. Context aggregation engine 306 may derive complex network context information. For example, context aggregation engine 306 may process calendars, emails, or maintenance request records to derive future network availability, usage, or reliability. In one example, a high number of maintenance request related to a particular connection on network 310 may indicate reliability issues. In another example, context aggregation engine 306 may derive network security information based in part on network access logs. Context aggregation engine 306 may update network profile 342-2 with derived complex network context information.

Context aggregation engine 306 may additionally aggregate user information on a user of information handling system 352. The user information may be associated with a user account for the user on information handling system 352 or workgroup 350. As an example and not by way of limitation, user information may include user preferences, usage of information handling systems, user classification, user status, user location, or user schedule. In some embodiments, context aggregation engine 306 may aggregate and store user information into user profile 342-1.

In some embodiments, context aggregation engine 306 may aggregate application information describing applications executing on information handling system 352. Such application information may include, for example, resource requirements, resource usage, application settings, application status, or application version, among others. In some embodiments, context aggregation engine 306 may aggregate and store application information into application profile 324-4. Context aggregation engine 306 may derive complex application context information. For example, context aggregation engine 306 may process application usage records, determine for example, average run time of an application, user statistics, expected performance, optimal settings, peak usage time, or any other information related to application 134. Context aggregation engine 306 may update aggregate application profile 324-4 with derived complex context information.

In particular embodiments, context aggregation engine 306 may communicate context information with other elements in distributed workload optimization 300. For example, context aggregation engine 306 may communicate context information to decision engine 308, action engine 304, or another element in distributed workload optimization 300, such as via network 310. As an example and not by way of limitation, context information communicated by context aggregation engine 306 may include information from profiles 342, or any other information.

In some embodiments, context aggregation engine 306 may detect and dynamically adjust to changes in distributed workload optimization 300. For example, context aggregation engine 306 may detect a new information handling system 352. In response to the new information handling system 352 joining workgroup 350 or connecting to network 310, context aggregation engine 306 may begin aggregating context information from the new information handling system 352.

In another example and not by way of limitation, context aggregation engine 306 may detect a portable electronic device (e.g., cellphone, laptop, PDA, etc.) communicatively coupling (e.g., by wired, wireless, Bluetooth, or any other communicative means) to network 310 or to information handling systems 352. Context aggregation engine 306 may instruct the portable electronic device to download and install software to support workload optimization 200 described in FIG. 2, such as at least certain portions of workload optimizer 202. In some embodiments, context aggregation engine 306 may update appropriate profiles 342 upon detecting changes in workgroup 350. For example, context aggregation engine 306 may be configured to update IHS profile 342 upon detecting information handling system 352 joining or leaving workgroup 350.

Context aggregation engine 306 may be implemented in any suitable manner. For example, context aggregation engine 306 may be implemented by code, instructions, libraries, shared libraries, software-as-a-service, functions, applications, scripts, or executables. In some embodiments, context aggregation engine 306 may be executed at information handling system 352. Although context aggregation engine 306 is illustrated as a single element, context aggregation engine 306 may be implemented through a combination of elements. For example, context aggregation engine 306 may be included in workload optimizer 202.

Context aggregation engine 306 may analyze and act in accordance with one or more profiles 342 maintained and managed by distributed profile manager 340, as described above. In certain embodiments, profiles 342 may be selected, created, modified, and removed from distributed profile manager 340 by a network administrator of network 310. For example, the network administrator may modify network profile 342-2 for to implement a power conservation network policy. In particular embodiments, profiles 342 may be selected, created, modified, and removed from distributed profile manager 340 by context aggregation engine 306. For example, context aggregation engine 306 may select IHS profile 342-3 for conserving power upon detecting that a computer system has been unplugged from a power source. In some embodiments, distributed profile manager 340 may be an application configured to manage profiles 342 and communicate profile information to context aggregation engine 306. As such, distributed profile manager 340 may operate in a similar manner to IHS profile manager 240 in FIG. 2.

In distributed workload optimizer 302, decision engine 308 may determine an optimal distribution of resources. In one embodiment, decision engine 308 may be configured to receive a resource request, such as a workload request for a computing task for distributed execution. For example, information handling system 352 may request resources for processing numerical computations, displaying a presentation, launching an application, or other computing tasks. Decision engine 308 may distribute a resource request into multiple resource requests. For example, decision engine 308 may split a request to display a presentation into a request to run an application for opening the presentation and a request to display the output from the application.

Decision engine 308 may be communicatively coupled to context aggregation engine 306, for example, to analyze or query context information, as described above. In some embodiments, decision engine 308 may analyze complex context information derived by context aggregation engine 306. Decision engine 308 may also initiate the aggregation of context information. For example, upon receiving a resource request, decision engine 308 may determine that additional context information is indicated to make a particular decision. Accordingly, decision engine 308 may request context aggregation engine 306 provide additional context information. In response, context aggregation engine 306 may aggregate additional context information by, for example, deriving complex context information or processing additional sources for context information.

In some embodiments, decision engine 308 may distribute resource requests based on context information. For example, when context information indicates information handling system 352-1 is temporarily disconnected from network 310, decision engine 308 may decide not to distribute a resource request to information handling system 352-1. Similarly, when context information indicates a particular information handling system 352-2 is likely to disconnect from network 310 in the near future, then decision engine 308 may decide not to distribute a resource request to information handling system 352-2 because of, for example, an expected duration of the resource request. In another example, when context aggregation engine 306 determines that two users are on the same team, for example from respective user profiles 342-1, then decision engine 308 may assign common computing resources, such as applications or calendars, to fulfill resource requests by the users. In another example, decision engine 308 may distribute resources based on current or future location of a user. When a user is physically located in a conference room and requesting resources to stream a multimedia presentation, then decision engine 308 may select certain information handling systems 352 within close proximity to the user to fulfill the resource request, such as by executing certain computing tasks to support the multimedia streaming.

In some embodiments, decision engine 308 may distribute resource requests based on optimization criteria, such as optimization criteria for certain hardware resources. In some embodiments, the optimization criteria may be specific to particular application or activity, such as speed, power, priority, security, reliability, location, etc. Decision engine 308 may receive optimization criteria with the resource request. For example, the resource request may indicate prioritization of speed over security for processing the resource request. In some embodiments, decision engine 308 may derive optimization criteria from context information. As an example and not by way of limitation, a computationally intensive application, such as MATLAB™ from The MathWorks, Incorporated of Natick, Mass., may contain an application profile 342-2 indicating the application is resource intensive. Based on application profile 342-2, decision engine 308 may accordingly determine optimization criteria that indicate prioritizing processing and memory resources over graphics or storage, for example.

Decision engine 308 may be implemented in any suitable manner. For example, decision engine 308 may be implemented by code, instructions, libraries, shared libraries, software-as-a-service, functions, applications, scripts, or executables. Although decision engine 308 is illustrated as a single element, decision engine 308 may be implemented through a combination of elements. For example, in one embodiment, decision engine 308 may be distributed across various information handling systems 352 within workgroup 350.

In distributed workload optimizer 302, action engine 304 may initiate actions to fulfill a resource request and may be communicatively coupled to decision engine 308. In some embodiments, action engine 304 may receive an optimized resource request from decision engine 308, such as specifying an allocation of hardware resources to a particular workload request for distributed execution. In some embodiments, the optimized resource request from decision engine 308 may identify the information handling system 352 associated with fulfilling a resource request. As an example and not by way of limitation, action engine 304 may initiate the execution of an application on information handling system 352-1 system based on an optimized resource request from decision engine 308 identifying information handling system 352-1 and the application.

Action engine 304 may be implemented in any suitable manner. For example, action engine 304 may be implemented by code, instructions, libraries, shared libraries, software-as-a-service, functions, applications, scripts, or executables. Although action engine 304 is illustrated as a single element, action engine 304 may be implemented through a combination of elements. For example, in one embodiment, action engine 304 may be distributed across various information handling systems 352 within workgroup 350.

Although the functionality of context aggregation engine 306, decision engine 308, and action engine 304 are described as separate elements in FIG. 3, the functionality of each of these may be implemented by any suitable portion of distributed workload optimization 300.

In operation of distributed workload optimization 300 for optimizing distributed workloads to information handling systems 352, distributed workload optimizer 302 may receive a workload request from information handling system 352-1 specifying a computing task for distributed execution. Then, context aggregation engine 306 may, based on the workload request, determine workload attributes for the computing task. The workload attributes may include dependency of the computing task on hardware resources included in information handling systems 352, such as hardware resources 260 described previously.

Then, context aggregation engine 306 may identify information handling systems 352 or other information handling systems via network 310 for the distributed execution of the computing task, referred to as distributed information handling systems. For example, the identified information handling systems may execute at least certain portions of workload optimizer 202 to support operation with distributed workload optimization 300. Context aggregation engine 306 may further identify hardware resources present at the distributed information handling systems, referred to as distributed hardware resources. Then, based on the workload attributes determined and the distributed hardware resources identified, context aggregation engine 306 (or decision engine 308 in some embodiments) may determine a preliminary allocation of the computing task among the distributed hardware resources. The preliminary allocation may represent a desired allocation of the hardware resources, but may be based on context information that was previously collected and may not be completely accurate at the present time, due to ongoing changes at information handling systems 352. Then, context aggregation engine 306 (or action engine 304 in some embodiments) may send a first request to the distributed information handling systems requesting confirmation of the preliminary allocation. In response, first distributed resource information may be received from at least some of the distributed information handling systems. It is noted that timeout may be applied for responses to the first request. The first distributed resource information may describe, or specify, distributed hardware resources currently available at the distributed information handling systems for distributed execution of the computing task.

Based on the first distributed resource information, context aggregation engine 306 (or decision engine 308 in some embodiments) may determine a confirmed allocation of the computing task among the distributed hardware resources. The confirmed allocation may include or represent a workload policy 354 describing the distributed hardware resources for distributed execution of the computing task. Then, based on the confirmed allocation, context aggregation engine 306 (or action engine 304 in some embodiments) may send a second request to at least the responding distributed information handling systems, referred to as the confirmed distributed information handling systems, to make the distributed hardware resources described in the first distributed resource information exclusively available for the computing task. The second request may include, or may represent, workload policy 354 that was determined by context aggregation engine 306 (or decision engine 308 in some embodiments) when the confirmed allocation was determined. Context aggregation engine 306 (or action engine 304 in some embodiments) may then segment the computing task among the confirmed distributed information handling systems for the distributed execution. Context aggregation engine 306 (or action engine 304 in some embodiments) may then send the segmented computing task to respect ones of the confirmed distributed information handling systems. In response, context aggregation engine 306 (or action engine 304 in some embodiments) may receive segmented output of the computing task (or results of the computing task) from respective ones of the confirmed distributed information handling systems. Then, context aggregation engine 306 (or action engine 304 in some embodiments) may assemble the segmented output to generate assembled output of the computing task. Finally, context aggregation engine 306 (or action engine 304 in some embodiments) may send the assembled output back to information handling system 352-1, which requested distributed execution of the computing task.

Despite the dual allocation procedure described above for distributed execution of the workload task, including the preliminary allocation and the confirmed allocation, ongoing changes at information handling systems 352 may result in the first distributed resource information becoming outdated or obsolete in a relatively short time. Thus, context aggregation engine 306 (or decision engine 308 in some embodiments) may receive an indication specifying a change in the first distributed resource information. Based on the change, the confirmed allocation may be updated and second distributed resource information indicative of the change may be generated. Then, the procedure described above may be repeated, as desired, to perform the distributed execution of the computing task.

Figure 4:
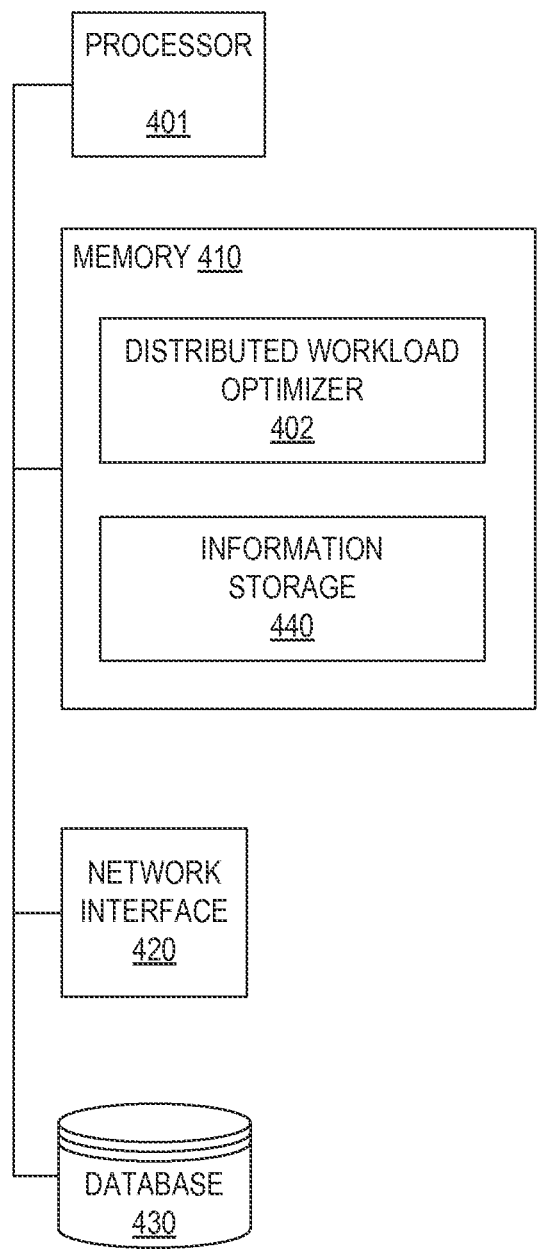
FIG. 4 is a block diagram of selected elements of an embodiment of a workload optimization server.

Referring now to FIG. 4, a block diagram of selected elements of an embodiment of workload optimization server 400 is illustrated. In FIG. 4, workload optimization server 400 is represented as an information handling system including physical and logical components for implementing workload optimization, as described herein, and accordingly includes processor 401, memory 410, and network interface 420. Processor 401 may represent one or more individual processing units and may execute program instructions, interpret data, and process data stored by memory 410 or another storage, such as database 430, among other examples. Although workload optimization server 400 is shown including physical and logical components in FIG. 4, it will be understood that workload optimization server 400 (or database 430) may be implemented using shared hardware resources, such as in a virtual machine under a hypervisor, for example in a rack domain that hosts a plurality of virtual servers.

In FIG. 4, memory 410 is communicatively coupled to processor 401 and may comprise a system, device, or apparatus suitable to retain program instructions and data for a period of time (e.g., computer-readable media). Memory 410 may include various types components and devices, such as random access memory (RAM), electrically erasable programmable read-only memory (EEPROM), a PCMCIA card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory. Non-volatile memory refers to a memory that retains data after power is turned off. It is noted that memory 410 may include different numbers of physical storage devices, in various embodiments.

As shown in FIG. 4, memory 410 may include distributed workload optimizer 402 for distributed workload optimization, as described herein. In certain embodiments, workload optimizer 402 represents an implementation of workload optimizer 302 as described with respect to FIG. 3. Information storage 440 may store various data and parameters, such as data and parameters associated with workload optimization, as described herein. In some embodiments, database 430 may include an individual information handling system that operates with database functionality.

Figure 5:
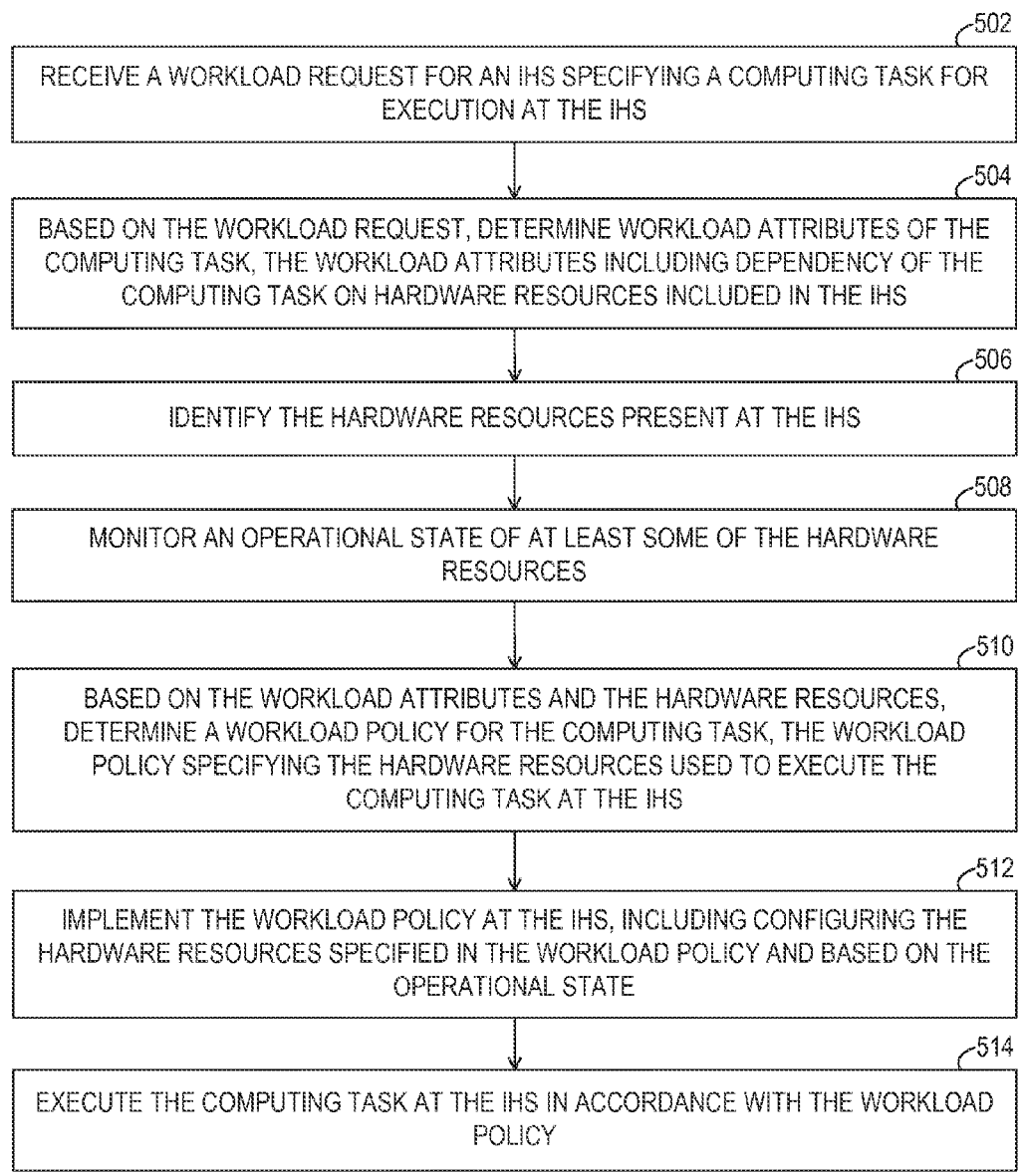
FIG. 5 illustrates a flowchart of selected elements of a method for dynamically controlled workload execution.

FIG. 5 illustrates an example method 500 for dynamically controlled workload execution, in accordance with some embodiments of the present disclosure. Method 500 may be implemented using workload optimization 200, as described with respect to FIG. 2. It is noted that certain operations described in method 500 may be optional or may be rearranged in different embodiments.

Method 500 begins by receiving (operation 502) a workload request for an information handling system specifying a computing task for execution at the information handling system. Based on the workload request, workload attributes of the computing task are determined (operation 504), the workload attributes including dependency of the computing task on hardware resources included in the information handling system. The hardware resources present at the information handling system are identified (operation 506). An operational state of at least some of the hardware resources is monitored (operation 508). Based on the workload attributes and the hardware resources, a workload policy for the computing task is determined (operation 510), the workload policy specifying the hardware resources used to execute the computing task at the information handling system. The workload policy is implemented (operation 512) at the information handling system, including configuring the hardware resources specified in the workload policy and based on the operational state. The computing task is executed (operation 514) at the information handling system in accordance with the workload policy.

Figure 6A:
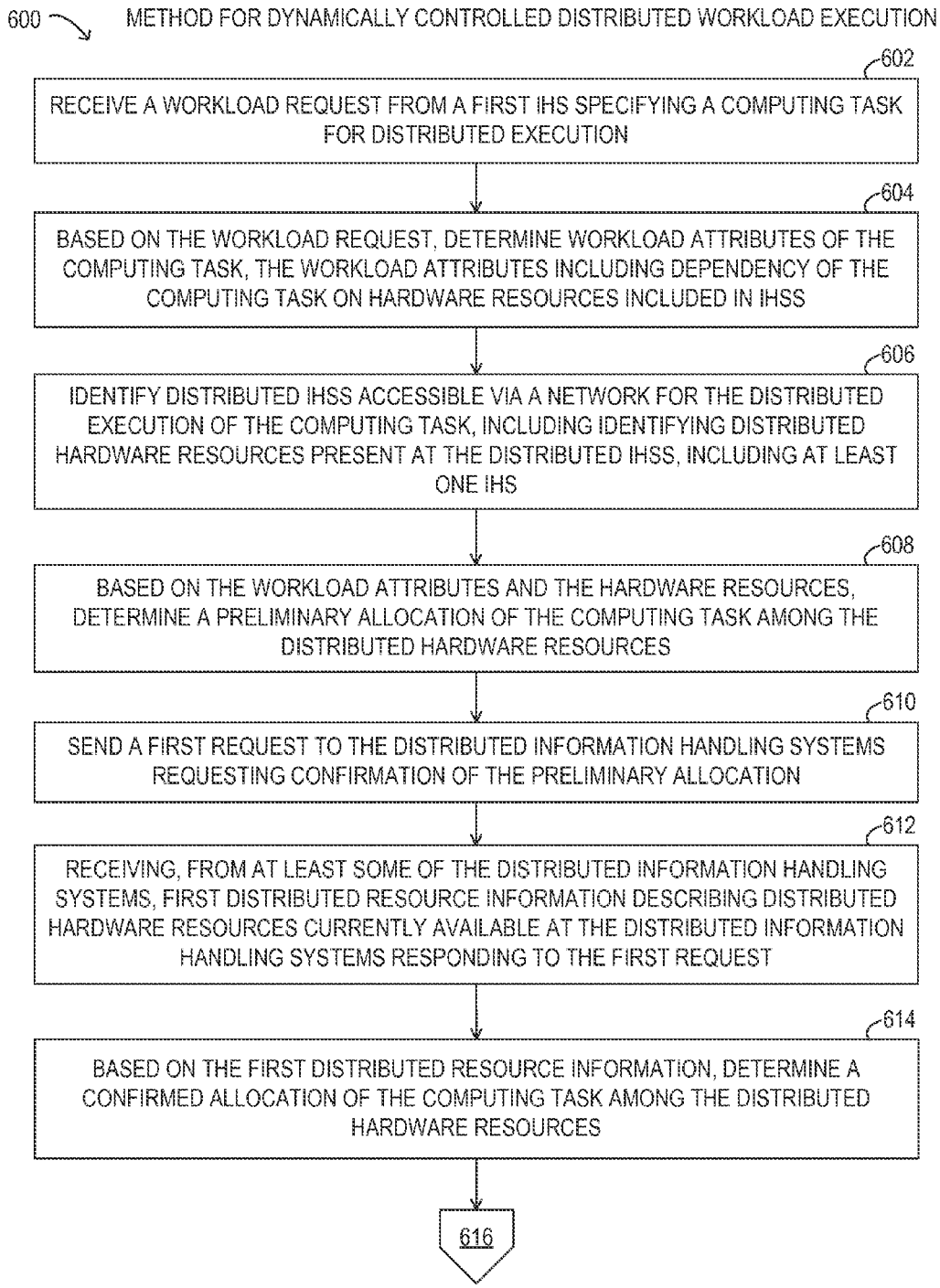
FIGS. 6A and 6B illustrate a flowchart of selected elements of a method for dynamically controlled distributed workload execution.
Figure 6B:
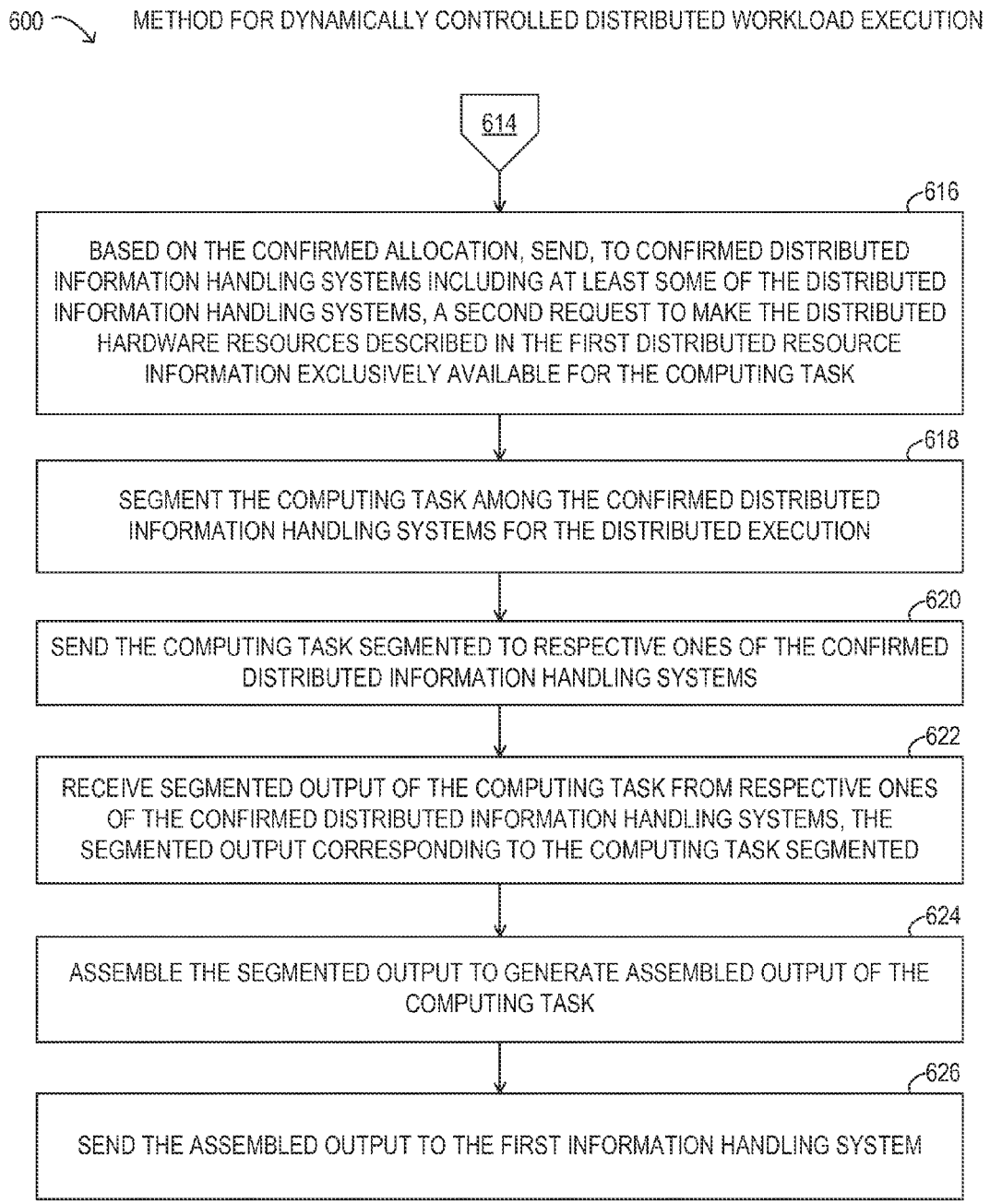

FIGS. 6A and 6B illustrate an example method 600 for dynamically controlled distributed workload execution, in accordance with some embodiments of the present disclosure. Method 600 may be implemented using distributed workload optimization 300, as described with respect to FIG. 3. It is noted that certain operations described in method 600 may be optional or may be rearranged in different embodiments.

Method 600 begins by receiving (operation 602) a workload request from a first information handling system specifying a computing task for distributed execution. Based on the workload request, workload attributes of the computing task are determined (operation 604), the workload attributes including dependency of the computing task on hardware resources included in information handling systems. Distributed information handling systems accessible via a network are identified (operation 606) for the distributed execution of the computing task, including identifying distributed hardware resources present at the distributed information handling systems, including at least one information handling system. Based on the workload attributes and the hardware resources, a preliminary allocation of the computing task among the distributed hardware resources is determined (operation 608). A first request is sent (operation 610) to the distributed information handling systems requesting confirmation of the preliminary allocation. First distributed resource information is received (operation 612) from at least some of the distributed information handling systems describing distributed hardware resources currently available at the distributed information handling systems responding to the first request. Based on the first distributed resource information, a confirmed allocation of the computing task is determined (operation 614) among the distributed hardware resources.

After operation 614, method 600 may proceed to operation 616 in FIG. 6B. Based on the confirmed allocation, a second request is sent (operation 616), to confirmed distributed information handling systems including at least some of the distributed information handling systems, to make the distributed hardware resources described in the first distributed resource information exclusively available for the computing task. The computing task is segmented (operation 618) among the confirmed distributed information handling systems for the distributed execution. The computing task segmented is sent (operation 620) to respective ones of the confirmed distributed information handling systems. Segmented output of the computing task is received (operation 622) from respective ones of the confirmed distributed information handling systems, the segmented output corresponding to the computing task segmented. The segmented output is assembled (operation 624) to generate assembled output of the computing task. The assembled output is sent (operation 626) to the first information handling system.

Figure 7:
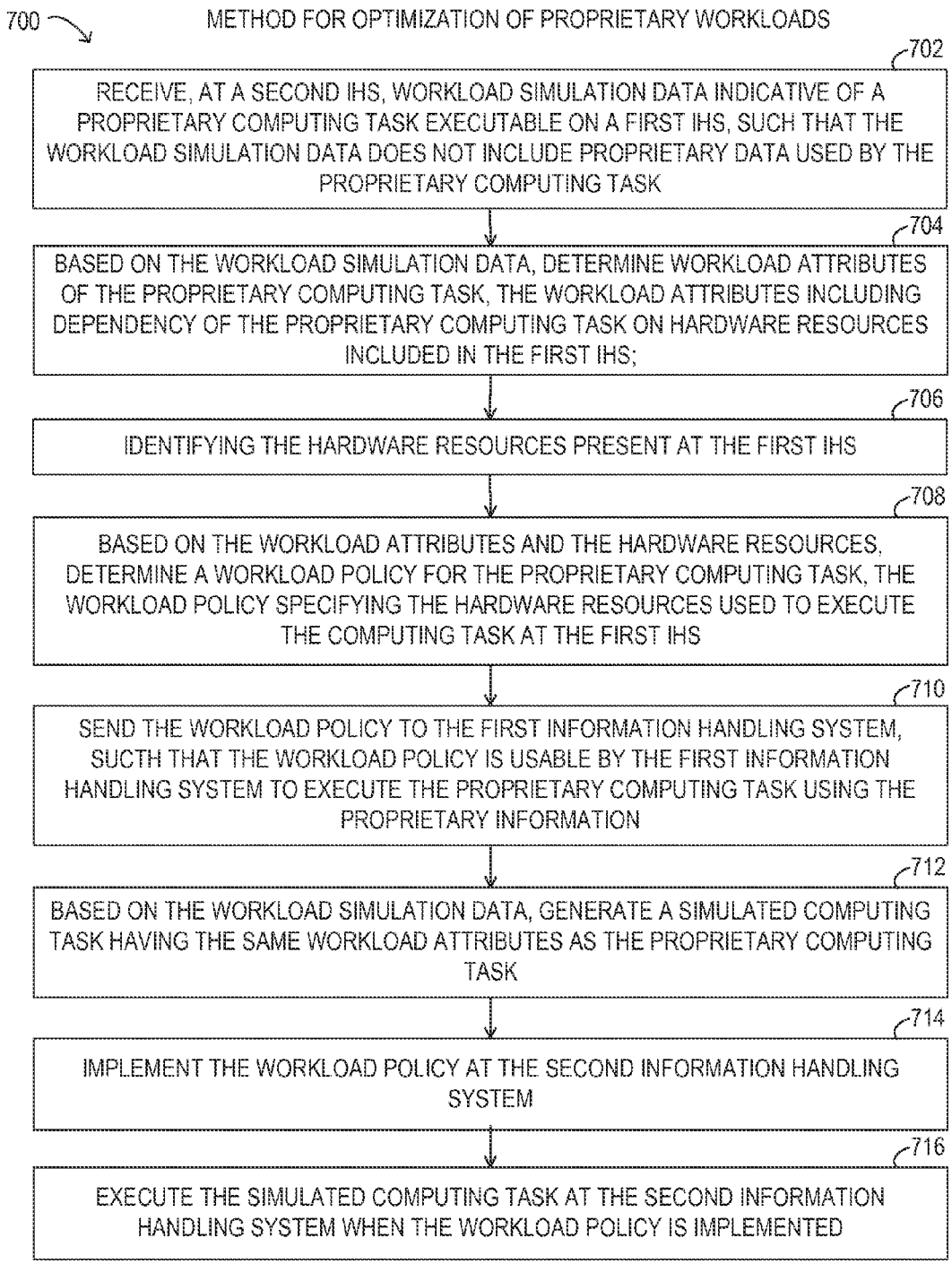
FIG. 7 illustrates a flowchart of selected elements of a method for optimization of proprietary workloads.

FIG. 7 illustrates an example method 700 for optimization of proprietary workloads, in accordance with some embodiments of the present disclosure. Method 700 may be implemented using workload optimization 200, as described with respect to FIG. 2. It is noted that certain operations described in method 700 may be optional or may be rearranged in different embodiments.

Method 700 beings by receiving (operation 702), at a second information handling system, workload simulation data indicative of a proprietary computing task executable on a first information handling system, such that the workload simulation data does not include proprietary data used by the proprietary computing task. Based on the workload simulation data, workload attributes of the proprietary computing task are determined (operation 704), the workload attributes including dependency of the proprietary computing task on hardware resources included in the first information handling system. The hardware resources present at the first information handling system are identifying (operation 706). Based on the workload attributes determined and the hardware resources identified, a workload policy is determined (operation 708) at the second information handling system for the proprietary computing task, such that the workload policy specifies the hardware resources used to execute the computing task at the first information handling system. The workload policy is sent (operation 710) to the first information handling system, such that the workload policy is usable by the first information handling system to execute the proprietary computing task using the proprietary information. Based on the workload simulation data, a simulated computing task is generated (operation 712) having the same workload attributes as the proprietary computing task. The workload policy is implemented (operation 714) at the second information handling system. The simulated computing task is executed (operation 716) at the second information handling system when the workload policy is implemented.

Figure 8:
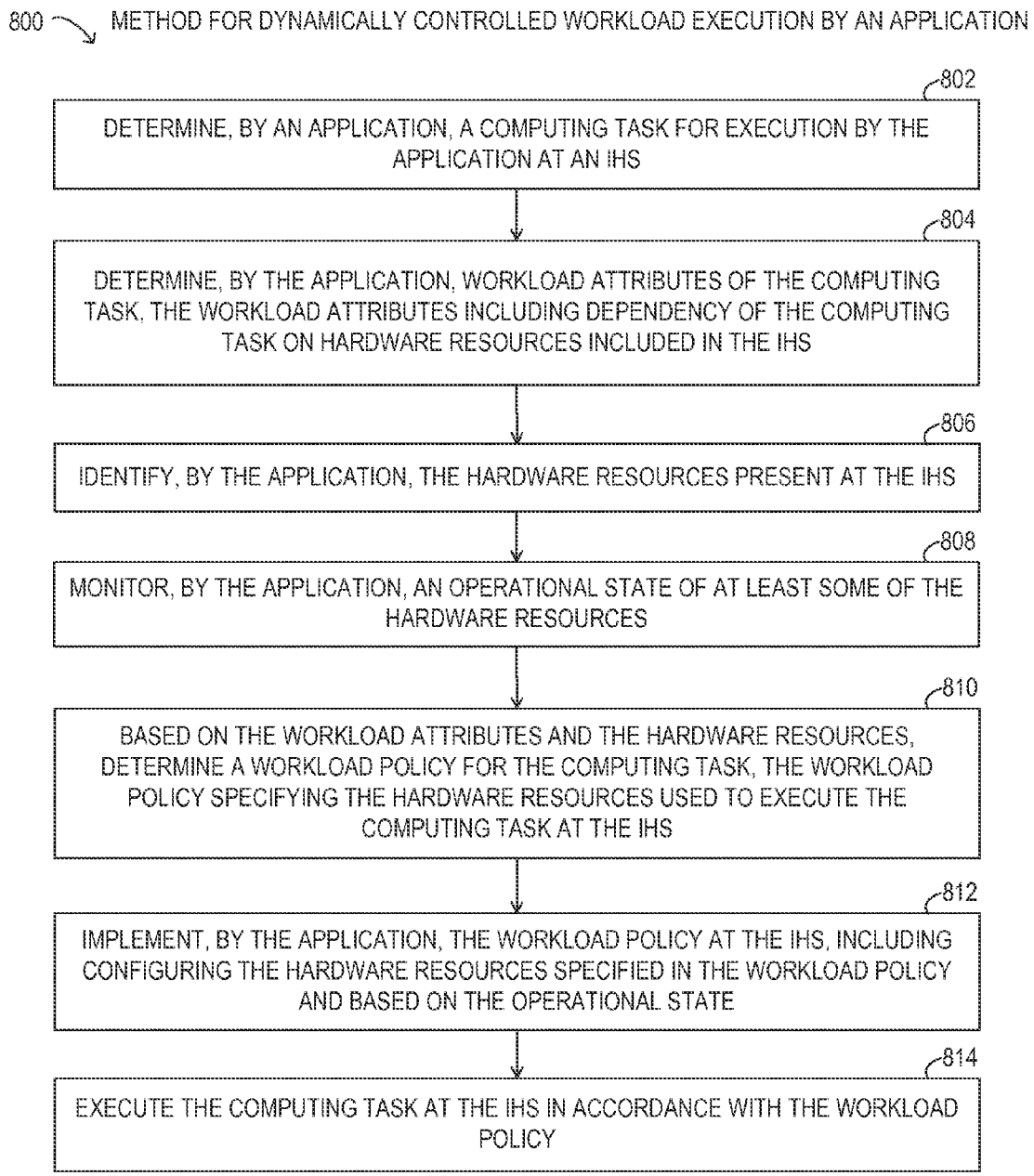
FIG. 8 illustrates a flowchart of selected elements of a method for dynamically controlled workload execution by an application.

FIG. 8 illustrates an example method 800 for dynamically controlled workload execution by an application, in accordance with some embodiments of the present disclosure. Method 800 may be implemented using application 134 that implements at least certain portions of workload optimization 200, as described with respect to FIGS. 1 and 2. Application 134 may be any application, for example, that executes under an operating system and provides functionality to a user of the operating system. Application 134 may be compiled to include at least certain portions of workload optimizer 202 using a software development kit (or other libraries) to integrate functionality of workload optimization 200 into application 134. It is noted that certain operations described in method 800 may be optional or may be rearranged in different embodiments.

Method 800 begins by determining (operation 802), by an application, a computing task for execution by the application at an information handling system. Workload attributes of the computing task are determined (operation 804) by the application, the workload attributes including dependency of the computing task on hardware resources included in the information handling system. The hardware resources present at the information handling system are identified (operation 806) by the application. An operational state of at least some of the hardware resources is monitored (operation 808) by the application. Based on the workload attributes and the hardware resources, a workload policy for the computing task is determined (operation 810), the workload policy specifying the hardware resources used to execute the computing task at the information handling system. The workload policy is implemented (operation 812) by the application at the information handling system, including configuring the hardware resources specified in the workload policy and based on the operational state. The computing task is executed (operation 814) at the information handling system in accordance with the workload policy.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method for optimizing proprietary workloads on information handling systems, the method comprising:
   receiving, at a second information handling system, workload simulation data indicative of a proprietary computing task executable on a first information handling system, wherein the workload simulation data does not include proprietary data used by the proprietary computing task;
   based on the workload simulation data, determining workload attributes of the proprietary computing task, the workload attributes including dependency of the proprietary computing task on hardware resources included in the first information handling system, wherein the workload attributes specify a degree of acceleration by a graphics processing unit used by the proprietary computing task;
   identifying the hardware resources present at the first information handling system;
   based on the workload attributes determined and the hardware resources identified, determining, at the second information handling system, a workload policy for the proprietary computing task, wherein the workload policy specifies the hardware resources used to execute the computing task at the first information handling system; and
   sending the workload policy to the first information handling system, wherein the workload policy is usable by the first information handling system to execute the proprietary computing task using the proprietary information.

2. The method of claim 1, further comprising:
   based on the workload simulation data, generating a simulated computing task having the same workload attributes as the proprietary computing task;
   implementing the workload policy at the second information handling system; and
   executing the simulated computing task at the second information handling system when the workload policy is implemented.

3. The method of claim 1, wherein the workload simulation data specifies an application executing on the second information handling system associated with the proprietary computing task, and wherein the workload attributes further specify at least one of:
   a degree of multithreading used by the proprietary computing task;
   a thread priority used by the proprietary computing task;
   an instruction set architecture used by the proprietary computing task;
   a memory capacity used by the proprietary computing task;
   a memory data throughput used by the proprietary computing task;
   a memory cache capacity used by the proprietary computing task;
   a memory cache architecture used by the proprietary computing task;
   a degree of non-uniform memory access permitted by the proprietary computing task;
   a degree of background execution permitted by the proprietary computing task;
   a network latency permitted by the proprietary computing task;

a storage capacity used by the proprietary computing task;
a storage data throughput used by the proprietary computing task;
a storage latency permitted by the proprietary computing task;
a vertical synchronization setting permitted by the proprietary computing task;
a degree of digital signal processing used by the proprietary computing task;
a degree of integer processing used by the proprietary computing task;
a degree of background execution permitted by the proprietary computing task; and
an operating system used by the proprietary computing task.

4. The method of claim 3, wherein a user of the first information handling system is associated with the proprietary computing task.

5. The method of claim 4, wherein determining the workload policy includes:
determining the workload policy based on the application and the user.

6. The method of claim 1, wherein the workload simulation data matches a computational complexity of the proprietary computing task, and wherein the hardware resources are selected from at least one of:
a number of processor cores available;
a degree of exclusive access to processor cores available;
a degree of processor multithreading available;
a degree of background execution available;
a degree of user mode execution available;
a processor frequency;
a processor architecture;
a processor cache architecture;
a processor power state;
a processor cache capacity available;
a processor power consumption available;
an instruction set architecture available;
a graphics processing unit available;
a memory capacity available;
a memory throughput available;
a degree of non-uniform memory access available;
a storage capacity available;
a storage throughput available;
a storage latency available;
a network capacity available;
a network throughput available;
a network latency available;
a system reboot feature; and
a system power down feature.

7. The method of claim 1, wherein the workload simulation data include a monitored state of at least some of the hardware resources at the first information handling system.

8. At least one non-transitory computer readable medium, comprising computer readable instructions for optimizing proprietary workloads on information handling systems, the instructions, when executed, cause a processor to:
receive, at a second information handling system, workload simulation data indicative of a proprietary computing task executable on a first information handling system, wherein the workload simulation data does not include proprietary data used by the proprietary computing task;
based on the workload simulation data, determine workload attributes of the proprietary computing task, the workload attributes including dependency of the proprietary computing task on hardware resources included in the first information handling system, wherein the workload simulation data include a monitored state of at least some of the hardware resources at the first information handling system, and wherein the workload attributes specify a degree of acceleration by a graphics processing unit used by the proprietary computing task;
identify the hardware resources present at the first information handling system;
based on the workload attributes determined and the hardware resources identified, determine, at the second information handling system, a workload policy for the proprietary computing task, wherein the workload policy specifies the hardware resources used to execute the computing task at the first information handling system; and
send the workload policy to the first information handling system, wherein the workload policy is usable by the first information handling system to execute the proprietary computing task using the proprietary information.

9. The computer readable medium of claim 8, further comprising instructions to:
based on the workload simulation data, generate a simulated computing task having the same workload attributes as the proprietary computing task;
implement, at the first information handling system, the workload policy; and
execute, at the first information handling system, the simulated computing task when the workload policy is implemented.

10. The computer readable medium of claim 8, wherein the workload simulation data specifies an application executing on the second information handling system associated with the proprietary computing task, and wherein the workload attributes further specify at least one of:
a degree of multithreading used by the proprietary computing task;
a thread priority used by the proprietary computing task;
an instruction set architecture used by the proprietary computing task;
a memory capacity used by the proprietary computing task;
a memory data throughput used by the proprietary computing task;
a memory cache capacity used by the proprietary computing task;
a memory cache architecture used by the proprietary computing task;
a degree of non-uniform memory access permitted by the proprietary computing task;
a degree of background execution permitted by the proprietary computing task;
a network latency permitted by the proprietary computing task;
a storage capacity used by the proprietary computing task;
a storage data throughput used by the proprietary computing task;
a storage latency permitted by the proprietary computing task;
a vertical synchronization setting permitted by the proprietary computing task;
a degree of digital signal processing used by the proprietary computing task;
a degree of integer processing used by the proprietary computing task;

a degree of background execution permitted by the proprietary computing task; and an operating system used by the proprietary computing task.

11. The computer readable medium of claim 10, wherein a user of the first information handling system is associated with the proprietary computing task.

12. The computer readable medium of claim 11, wherein the instructions to determine the workload policy include instructions to:

determine the workload policy based on the application and the user.

13. The computer readable medium of claim 8, wherein the workload simulation data matches a computational complexity of the proprietary computing task, and wherein the hardware resources are selected from at least one of:

a number of processor cores available;
a degree of exclusive access to processor cores available;
a degree of processor multithreading available;
a degree of background execution available;
a degree of user mode execution available;
a processor frequency;
a processor architecture;
a processor cache architecture;
a processor power state;
a processor cache capacity available;
a processor power consumption available;
an instruction set architecture available;
a graphics processing unit available;
a memory capacity available;
a memory throughput available;
a degree of non-uniform memory access available;
a storage capacity available;
a storage throughput available;
a storage latency available;
a network capacity available;
a network throughput available;
a network latency available;
a system reboot feature; and
a system power down feature.

14. An information handling system for optimizing proprietary workloads, comprising:

a processor;
a memory communicatively coupled to the processor; and
a workload optimizer stored in the memory and including computer readable instructions that, when executed, cause the processor to:
receive, at the information handling system, workload simulation data indicative of a proprietary computing task executable on a second information handling system, wherein the workload simulation data does not include proprietary data used by the proprietary computing task;
based on the workload simulation data, determine workload attributes of the proprietary computing task, the workload attributes including dependency of the proprietary computing task on hardware resources included in the second information handling system, wherein the workload attributes specify a degree of acceleration by a graphics processing unit used by the proprietary computing task;
identify the hardware resources present at the second information handling system;
based on the workload attributes determined and the hardware resources identified, determine, at the second information handling system, a workload policy for the proprietary computing task, wherein the workload policy specifies the hardware resources used to execute the computing task at the second information handling system; and
send the workload policy to the second information handling system, wherein the workload policy is usable by the second information handling system to execute the proprietary computing task using the proprietary information.

15. The information handling system of claim 14, further comprising instructions to:

based on the workload simulation data, generate a simulated computing task having the same workload attributes as the proprietary computing task;
implement, at the second information handling system, the workload policy; and
execute, at the second information handling system, the simulated computing task when the workload policy is implemented.

16. The information handling system of claim 14, wherein the workload simulation data specifies an application executing on the second information handling system associated with the proprietary computing task, and wherein the workload attributes further specify at least one of:

a degree of multithreading used by the proprietary computing task;
a thread priority used by the proprietary computing task;
an instruction set architecture used by the proprietary computing task;
a memory capacity used by the proprietary computing task;
a memory data throughput used by the proprietary computing task;
a memory cache capacity used by the proprietary computing task;
a memory cache architecture used by the proprietary computing task;
a degree of non-uniform memory access permitted by the proprietary computing task;
a degree of background execution permitted by the proprietary computing task;
a network latency permitted by the proprietary computing task;
a storage capacity used by the proprietary computing task;
a storage data throughput used by the proprietary computing task;
a storage latency permitted by the proprietary computing task;
a vertical synchronization setting permitted by the proprietary computing task;
a degree of digital signal processing used by the proprietary computing task;
a degree of integer processing used by the proprietary computing task;
a degree of background execution permitted by the proprietary computing task; and
an operating system used by the proprietary computing task.

17. The information handling system of claim 16, wherein a user of the second information handling system is associated with the proprietary computing task.

18. The information handling system of claim 17, wherein determining the workload policy includes instructions to:

determine the workload policy based on the application and the user.

19. The information handling system of claim 14, wherein the workload simulation data matches a computational complexity of the proprietary computing task, and wherein the hardware resources are selected from at least one of:
- a number of processor cores available;
- a degree of exclusive access to processor cores available;
- a degree of processor multithreading available;
- a degree of background execution available;
- a degree of user mode execution available;
- a processor frequency;
- a processor architecture;
- a processor cache architecture;
- a processor power state;
- a processor cache capacity available;
- a processor power consumption available;
- an instruction set architecture available;
- a graphics processing unit available;
- a memory capacity available;
- a memory throughput available;
- a degree of non-uniform memory access available;
- a storage capacity available;
- a storage throughput available;
- a storage latency available;
- a network capacity available;
- a network throughput available;
- a network latency available;
- a system reboot feature; and
- a system power down feature.

20. The information handling system of claim 14, wherein the workload simulation data include a monitored state of at least some of the hardware resources at the second information handling system.

* * * * *